(Model.)

G. M. GREEN.
COUPLING FOR ROPES OR CABLES.

No. 297,073. Patented Apr. 15, 1884.

WITNESSES:
Theo. G. Hoster
C. Sedgwick

INVENTOR:
G. M. Green
BY Munn & Co
ATTORNEYS.

UNITED STATES PATENT OFFICE.

GEORGE M. GREEN, OF STREATOR, ILLINOIS.

COUPLING FOR ROPES OR CABLES.

SPECIFICATION forming part of Letters Patent No. 297,073, dated April 15, 1884.

Application filed January 3, 1884. (Model.)

*To all whom it may concern:*

Be it known that I, GEORGE M. GREEN, of Streator, in the county of La Salle and State of Illinois, have invented a new and improved Coupling for Ropes and Cables, of which the following is a full, clear, and exact description.

The object of my invention is to provide a new and improved coupling for sections of ropes, cables, chains, &c., which coupling is simple in construction, strong, and durable, and by means of which the cables, ropes, or chains can be coupled or uncoupled easily and rapidly.

The invention consists in the combination, with a socket having two longitudinal grooves in the sides of its aperture and two notches at the inner end of the aperture, of a key fitting in the aperture and provided with two opposite projections on the inner end. The socket is provided with a loop or frame, in which a spring is held, the free end of which rests on the inner end of the key.

Reference is to be had to the accompanying drawings, forming part of this specification, in which similar letters of reference indicate corresponding parts in all the figures.

Figure 1:
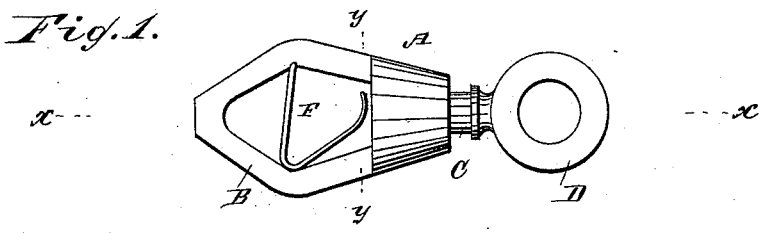
Figure 2:
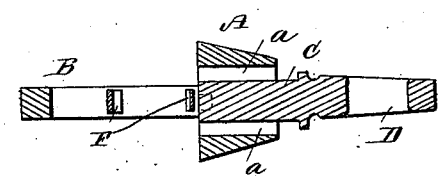
Figure 3:
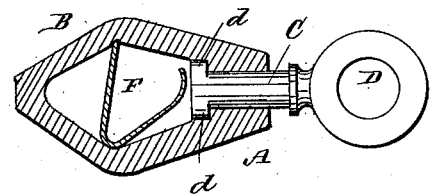
Figure 4:
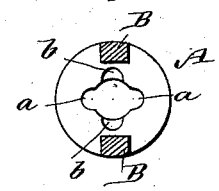
Figure 5:
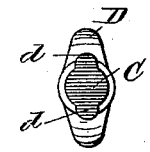

Figure 1 is a side view of my improved coupling for ropes and cables. Fig. 2 is a longitudinal sectional elevation of the same on the line $x\,x$, Fig. 1. Fig. 3 is a longitudinal sectional elevation of the same in a plane at right angles to the plane of Fig. 2. Fig. 4 is a cross-sectional view on the line $y\,y$, Fig. 1. Fig. 5 is an inner end view of the pin or key.

A socket, A, is provided with a loop or frame, B, having a U shape or any other suitable shape, to which frame the rope or cable is to be fastened. In the sides of the aperture two longitudinally diametrically opposite grooves, $a$, are formed, and in the inner end surface of the neck of the socket two recesses or notches, $b$, are formed at right angles to the grooves $a$—that is, the grooves $a$ and the notches $b$ are alternate, and are a quadrant apart. A key, C, fitting in the aperture of the socket, is provided at one end with a ring, D, eye, or loop, or other device for fastening the rope or cable, and at the opposite end with two diametrically-opposite laterally-projecting studs, $d$, fitted in the grooves $a$ and notches $b$. A V-shaped spring, F, is held in the frame B in such a manner that the free end of the same rests on the inner end of the neck of the socket.

The device is used in the following manner: The key C is passed through the aperture in the socket in such a manner that the projections $d$ pass through the grooves $a$. When the said projections have been passed entirely through the neck, the key C is turned on its longitudinal axis ninety degrees, so that the projections $d$ will be over the notches $b$. The spring F, acting on the inner end of the key, presses the same in the direction toward the outer end of the socket, and presses the projections $d$ into the notches $b$. The spring holds the key in place. If the rope or cable sections are to be uncoupled, the key is pressed inward, is then turned ninety degrees, so that the projection $d$ can pass through grooves $a$, and then the key is withdrawn.

Having thus described my invention, what I claim as new, and desire to secure by Letters Patent, is—

The combination, with the socket A, provided with a loop or frame, B, and having longitudinal grooves $a$ in the aperture and notches $b$ at the inner end of the aperture, of the key C, having two opposite projections, $d$, at the inner end, and means for securing the rope at the outer end, and of the spring F, held in the frame B, substantially as herein shown and described.

GEORGE M. GREEN.

Witnesses:
L. B. MORGAN,
G. M. BROWN.